(12) United States Patent
Shankar et al.

(10) Patent No.: US 12,483,287 B1
(45) Date of Patent: Nov. 25, 2025

(54) LOW-RATE WIRELESS PERSONAL AREA NETWORK (LR-WPAN) PREAMBLE DETECTION IN THE PRESENCE OF CONCURRENTLY TRANSMITTED WIRELESS SIGNALS

(71) Applicant: Amazon Technologies, Inc., Seattle, WA (US)

(72) Inventors: Srihari Shankar, Newark, CA (US); Ravi Ichapurapu, Morgan Hill, CA (US); Justin Christopher Kenny, Duvall, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 18/081,565

(22) Filed: Dec. 14, 2022

(51) Int. Cl.
*H04B 1/16* (2006.01)
*H03H 7/24* (2006.01)
*H04W 88/06* (2009.01)

(52) U.S. Cl.
CPC .............. *H04B 1/1638* (2013.01); *H03H 7/24* (2013.01); *H04W 88/06* (2013.01)

(58) Field of Classification Search
CPC ........ H04B 1/1638; H03H 7/24; H04W 88/06
USPC ........................................................ 455/132
See application file for complete search history.

(56) References Cited

U.S. PATENT DOCUMENTS

| | | | | |
|---|---|---|---|---|
| 5,960,047 A * | 9/1999 | Proctor, Jr. | ............ | H04B 17/27 455/132 |
| 7,826,547 B2 * | 11/2010 | Hansen | ................ | H04B 7/0613 375/267 |
| 8,503,581 B2 * | 8/2013 | Diaz Fuente | ..... | H04L 25/03012 370/464 |
| 9,407,298 B1 * | 8/2016 | Hwang | .................... | H04B 1/10 |
| 9,548,787 B1 * | 1/2017 | Lee | .......................... | H01Q 1/44 |
| 9,641,205 B1 * | 5/2017 | Hyun | ...................... | H04B 1/525 |
| 10,075,198 B1 * | 9/2018 | Lee | ......................... | H04W 84/12 |
| 10,581,155 B1 * | 3/2020 | Gradinaru | .............. | H04B 1/109 |
| 2005/0190724 A1 * | 9/2005 | Hansen | ............... | H04L 27/2613 370/329 |
| 2005/0286474 A1 * | 12/2005 | van Zelst | ............ | H04L 27/2613 370/334 |
| 2010/0061402 A1 * | 3/2010 | van Zelst | ............ | H04L 25/0226 370/474 |
| 2012/0243823 A1 * | 9/2012 | Giboney | .................. | H01P 1/162 385/14 |
| 2014/0073289 A1 * | 3/2014 | Velasco | ................. | H04W 12/04 455/411 |

(Continued)

*Primary Examiner* — April G Gonzales
(74) *Attorney, Agent, or Firm* — Eversheds Sutherland (US) LLP

(57) ABSTRACT

Technologies directed to preamble detection in co-existence environments of WLAN and LR-WPAN signals are described. One wireless device has a first radio that sends a first RF signal to a second wireless device and a second radio that operates according to the IEEE 802.15.4 standard. The wireless device includes a circuit coupled between the first radio and the second radio. The circuit detects a presence of the first RF signal. The circuit receives a second RF signal from a third wireless device and attenuates the second RF signal to obtain a third RF signal in response to the presence of the first RF signal being detected. The second radio receives the third RF signal and decodes a preamble using the third RF signal.

20 Claims, 9 Drawing Sheets

(56) References Cited

U.S. PATENT DOCUMENTS

| | | | |
|---|---|---|---|
| 2014/0155098 A1* | 6/2014 | Markham | H04L 1/22 |
| | | | 455/456.3 |
| 2016/0066307 A1* | 3/2016 | Huang | H04L 5/0023 |
| | | | 370/329 |
| 2017/0033891 A1* | 2/2017 | Alexander | H04L 69/18 |
| 2018/0365975 A1* | 12/2018 | Xu | G08B 29/185 |
| 2020/0091608 A1* | 3/2020 | Alpman | H03L 7/145 |
| 2021/0242894 A1* | 8/2021 | de Ruijter | H04B 1/18 |
| 2021/0390004 A1* | 12/2021 | Kundu | H04W 24/08 |
| 2023/0099161 A1* | 3/2023 | Holland | H03F 3/189 |
| | | | 330/295 |

* cited by examiner

LOW-RATE WIRELESS PERSONAL AREA NETWORK (LR-WPAN) PREAMBLE DETECTION IN THE PRESENCE OF CONCURRENTLY TRANSMITTED WIRELESS SIGNALS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
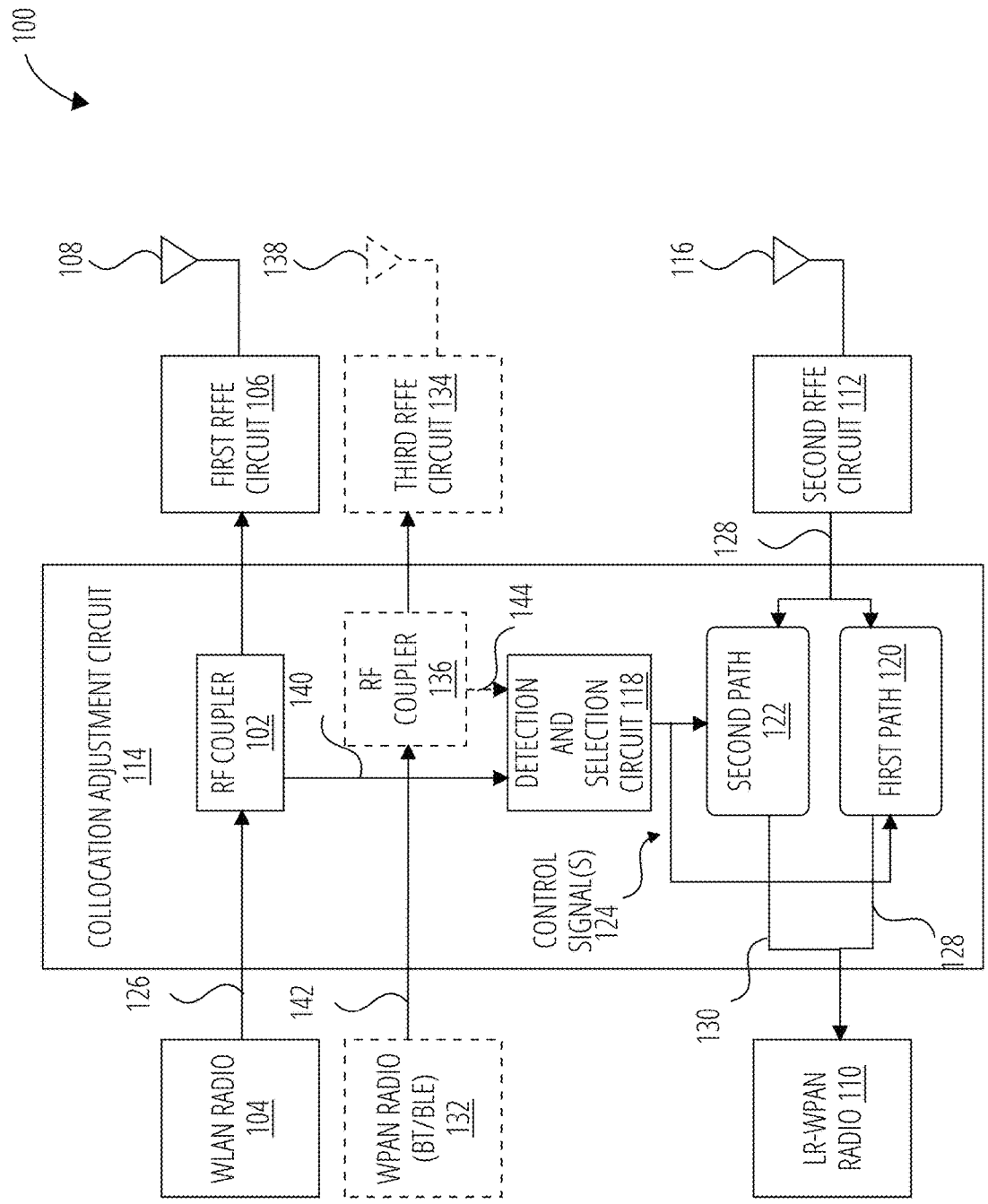
FIG. 1 is a block diagram of a wireless device with a collocation adjustment circuit for enabling preamble detection in the presence and absence of concurrently transmitted wireless signals according to at least one embodiment.

Technologies directed to preamble detection in co-existence environments of WLAN and LR-WPAN signals are described. The technologies described herein enable the simultaneous operation of multiple radios in the same frequency band on a compact device.

The 2.4 GHz industrial, scientific, and medical (ISM) radio band allows unlicensed wireless communications. Due to its unlicensed nature, many short ranged, low-power wireless communication systems operate in this frequency band. Since these radios occupy the same spectrum, careful designs are required to prevent interference between one another, often at the cost of reduced throughput or range for the radios. A Packet Traffic Arbitration (PTA) engine can be used to allow radio co-existence in the 2.4 GHz band, allowing one radio to operate at a time. The PTA engine can avoid simultaneous transmit (TX) operation and receive (RX) operation by collocated Wi-Fi® and ZigBee® radios. There are features, such as Whole Home Audio (WHA), that require a significant amount of wireless local area network (WLAN) traffic (e.g., the Wi-Fi® transmission), while other features, such as Smart Home security monitoring, require listening to a personal area network (PAN) radio or low-rate wireless personal area network (LR-WPAN) radio (e.g., ZigBee® endpoints or BLE radios) at all time for low latency and high reliability. Frustration-Free Setup (FFS) can have the PAN radio constantly scanning for new devices. Time-sharing between the WLAN and PAN/LR-WPAN radios becomes a complex trade-off of latency, reliability, and quality of the features, leaving little airtime for new features to further improve customer experience. Increased electrical isolation between co-existing radios and antennas will alleviate the time-sharing requirement. This is often realized by increasing spatial separation between the co-existing radios. However, compact, elegant, and desirable devices while the extra cost associated with spatially separate designs can be significant. Compact devices will be desirable and cost-effective when the PAN/LR-WPAN radio is implemented on the same printed circuit board (PCB) as the WLAN radio.

Radios using different technologies may need separate antennas. For example, the system may include one antenna using the Wi-Fi® technology for 2.4 GHz and another antenna using the Zigbee® technology for 2.4 GHz. Traditionally, these antennas need to be separated in space or time-division multiplexed during operation. For another example, the system may include one antenna using Bluetooth® technology for 2.4 GHz Bluetooth-Low Energy (BLE) and another antenna using the Zigbee® technology for 2.4 GHz or other radio technologies using the IEEE 802.15.4 standard, such as the Thread and Matter protocols. Similarly, these antennas need to be separated in space or time-divisional multiplexed during operation. Since both radios (e.g., WLAN and LR-WPAN radios) are on at the same time, one radio's transmit signal will present itself as an unwanted signal at the other radio's receiver, causing interference. Because of this interference, the operable range may be reduced. To maximize the operable range, isolation of at least 60 dB is desired between the two radios' antennas. However, this isolation is difficult to achieve in compact consumer electronics.

In order for the ZigBee® radio to initiate the RX operation and have a dedicated time slot allocated for it, a Zigbee preamble has to be successfully detected by the Zigbee radio. In particular, the PTA engine can shut down the TX operation of the Wi-Fi® chipset based on a PRIORITY and REQUEST line from the external Zigbee® chipset. For the Zigbee® chipset to activate the PRIORITY and REQUEST line for the RX operation, the Zigbee® chipset needs to effectively demodulate a preamble of a ZigBee® packet. When the collocated Wi-Fi® chipset is transmitting with high TX power, this reduces the receive sensitivity of the Zigbee® chipset, thereby reducing the range of the ZigBee® chipset, increasing the number of packet retries, or dropping packets. In short, a strong transmit signal from the Wi-Fi® radio desensitizes the Zigbee® receiver by acting as a jammer/blocker that saturates a low noise amplifier (LNA) of the Zigbee® receiver, which causes a failure of Zigbee preamble detection. Also, the transmitted signal falls in-band of the Zigbee® receiver, causing the noise floor in the Zigbee® receiver to increase. High spatial antenna isolation, in the order of 38 dB, is needed to allow successful preamble detection by the Zigbee® receiver. However, smart home consumer products with reduced form factors make it hard to achieve the required high spatial antenna isolation.

Aspects and embodiments of the present disclosure address the above and other deficiencies by providing an external RF rectifier circuit for energy detection of the transmitted signal and two paths, including an optimized sensitivity path and an optimized blocker path. The optimized block path is chosen in the presence of the in-band collocated radio jammer signal (e.g., transmitted Wi-Fi®/BT/BLE signal), leading to better linearity performance of the LNA of the Zigbee® chipset. In the absence of the in-band collocated radio jammer, the optimized sensitivity path with lesser insertion loss is chosen, which leads to a lower noise figure (NF) and better RX sensitivity of the Zigbee® chipset. Aspects and embodiments of the present disclosure can support simultaneous TX operation by the Wi-Fi® and the RX operation by the Zigbee® chipset. Aspects and embodiments of the present disclosure can optimize receiver performance by the Zigbee® chipset i) in the presence of a jammer signal from a transmitting radio (e.g., Wi-Fi® chipset, Bluetooth® chipset, or the like), and ii) in the absence of the jammer signal. Assuming the TX power of the Wi-Fi® chipset operates at 18 dBm and the TX power seen by the Zigbee® chipset is 20 dBm or less, the overall chip-to-chip isolation required is 38 dBm. It is not feasible achieving chip-to-chip isolation in reduced form factors, such as smart speakers and wearable devices. Aspects and embodiments of the present disclosure can combine two techniques to achieve the high isolation of 38 dB and leverage the presence of the jammer signal to choose a high isolation path and the absence of the jammer signal to regain the RX sensitivity of the Zigbee® chipset.

Aspects and embodiments of the present disclosure can provide a wireless device having a first radio that sends a first RF signal to a second wireless device and a second radio that is collocated with the first radio. The first and second radios can be collocated in physical space, in frequency, or both. The wireless device includes a circuit coupled between the first radio and the second radio. The circuit detects a presence of the first RF signal. The circuit receives a second RF signal from a third wireless device and attenuates the second RF signal to obtain a third RF signal in response to the presence of the first RF signal being detected. The second radio receives the third RF signal and decodes a preamble using the third RF signal. The first radio can operate according to the IEEE 802.11 standards and the second radio can operate according to the IEEE 802.15.4 standard. Alternatively, the first and second radios can use other radio technologies. Additional details of the wireless device are described below with respect to FIG. 1.

FIG. 1 is a block diagram of a wireless device 100 with collocation adjustment circuit 114 for enabling preamble detection in the presence and absence of concurrently transmitted wireless signals according to at least one embodiment. The wireless device 100 can be a voice-controlled device, a home automation device, a television, a set-top-box, a desktop computer, a security camera, a doorbell device, an electronic book reader, a personal digital assistant, a gaming controller, a gaming console, a mobile phone, a laptop computer, a portable media player, a tablet computer, a camera, a video camera, a netbook, an electronic notebook, a media player device, a media center, a sleep tracker device, a hands-free speaker, a hands-free virtual assistant device, or the like. The wireless device 100 can be an access point (AP) device that provides network access to one or more endpoint devices (also referred to as client devices). In another embodiment, the wireless device 100 can be a client device or an endpoint device that is not connected to any downstream devices. The wireless device 100 can include one or more processors, multiple radios, and one or more data stores. Alternatively, the wireless device 100 can be other types of devices.

As illustrated in FIG. 1, the wireless device 100 includes a WLAN radio 104 coupled to a first radio frequency front-end (RFFE) circuit 106, which is coupled to a first antenna 108. The WLAN radio 104 can implement the Wi-Fi® technology. The wireless device 100 includes an LR-WPAN radio 110 coupled to a second RFFE circuit 112, which is coupled to a second antenna 116. The LR-WPAN radio 110 can implement the Zigbee® technology, the Thread technology, the Matter technology, or other radio technologies using the IEEE 802.15.4 standards. In at least one embodiment, the first antenna 108 and the second antenna 116 share the same antenna structure. In at least one embodiment, the first antenna 108 and second antenna 116 have separate antenna structures. The wireless device 100 includes the collocation adjustment circuit 114 coupled between the WLAN radio 104 and the LR-WPAN radio 110. The collocation adjustment circuit 114 can enable the WLAN radio 104 and LR-WPAN radio 110 to operate simultaneously or concurrently, at least for preamble detection by the LR-WPAN radio 110 in the presence of transmitted signals by WLAN radio 104.

In at least one embodiment, the collocation adjustment circuit 114 includes an RF coupler 102, a detection and selection circuit 118, a first path 120, and a second path 122. The RF coupler 102 is coupled to an output port of WLAN radio 104 and can receive a first RF signal 126 from WLAN radio 104. The RF coupler 102 is coupled to the first RFFE circuit 106 and can pass the first RF signal 126 to the first RFFE circuit 106. The first RFFE circuit 106 sends the first RF signal 126 via the first antenna 108. The RF coupler 102 can also generate a copy of the first RF signal 140. The copy of the first RF signal 140 can be input into the detection and selection circuit 118. The detection and selection circuit 118 can detect a presence or absence of the first RF signal 126. The detection and selection circuit 118 can generate control signal(s) 124 in response to detecting the presence of the first RF signal 126. The control signal(s) 124 can be indicative of a presence or an absence of the first RF signal 126. In at least one embodiment, the detection and selection circuit 118 includes an RF rectifier circuit coupled to the RF coupler 102 and a selection circuit to control the selection of the first path 120 or the second path 122 according to various embodiments described herein. The RF rectifier circuit can detect the presence of the first RF signal using the copy of the first RF signal 140. The RF rectifier circuit can generate the control signal(s) 124 in response to detecting the presence of the first RF signal 126. The control signal(s) 124 can be used to control signal paths between the second RFFE circuit 112 and LR-WPAN radio 110. The collocation adjustment circuit 114 can include a first path 120 selectively coupled between an input port of the LR-WPAN radio 110 and the second RFFE circuit 112 and a second path 122 selectively coupled between the input port and the second RFFE circuit 112. In at least one embodiment, the second path 122 includes an attenuator circuit that receives a second RF signal 128 from the second RFFE circuit 112 and attenuates the second RF signal 128 to obtain a third RF signal 130. The detection and selection circuit 118 can be coupled to the first path 120 and second path 122 and can couple the second RFFE circuit 112 to the input port of the LR-WPAN radio 110 via the first path 120 or the second path 122. In at least one embodiment, the selection circuit is coupled to the RF rectifier circuit, the first path 120, and the second path 122. The selection circuit can couple the second RFFE circuit 112 to the input port of LR-WPAN radio 110 via the second path 122 in response to receiving the control signal from the RF rectifier circuit; otherwise, the selection circuit can couple the second RFFE circuit 112 to the input port of LR-WPAN radio 110 via the first path 120. The LR-WPAN radio 110 can detect a preamble of a packet using the third RF signal 130 in the presence of the first RF signal 126. The LR-WPAN radio 110 can detect a preamble of a packet in the second RF signal 128 in the absence of the first RF signal 126.

In at least one embodiment, the selection circuit includes a first switch coupled to the input port of LR-WPAN radio 110, a second switch coupled to the second RFFE circuit 112, and an inverter coupled between the first switch and the second switch. The first path 120 and the second path 122 can be coupled between the first switch and the second switch. The first switch receives the control signal from a detection circuit (e.g., an RF rectifier circuit). The inverter also receives the control signal and generates a second control signal inverted from the control signal. An inverter is a component or device that inverts a state or logic level of a signal to an opposite state or logic level. Thus, if a low signal is fed into an inverter, the inverter flips it to a high signal. If a high signal is fed into the inverter, the inverter flips it to a low signal. The second switch receives the second control signal from the inverter. The first switch and the second switch are activated to couple the second RFFE circuit 112 to the input port via the second path 122 in response to the control signal and the second control signal, respectively. When the first switch and the second switch are not activated, the second RFFE circuit 112 is coupled to the input port via the first path 120 (i.e., in response to the absence of the first RF signal 126). In other embodiments, a different state or level of the control signal(s) 124 can be used to indicate the absence of the first RF signal 126 to select the first path 120.

In at least one embodiment, the selection circuit includes a single-pole double-throw (SPDT) switch coupled to the second RFFE circuit 112 at a first terminal, the first path 120 at a second terminal, and the second path 122 at a third terminal. The first path and the second path are coupled to the input port. The SPDT switch couples the second RFFE circuit 112 to the input port via the second path 122 in response to the control signal. When the control signal is not activated, the SPDT switch couples the second RFFE circuit 112 to the input port via the first path 120.

In at least one embodiment, the wireless device 100 includes a WPAN radio 132 coupled to a third RFFE circuit 134, which is coupled to a third antenna 138. The WPAN radio 132 can implement the Bluetooth® technology (e.g., Bluetooth Classic (BT) or Bluetooth Low Energy (BLE)). Alternatively, the WPAN radio 132 can use other radio technologies. In at least one embodiment, the first antenna 108, the second antenna 116, and/or the third antenna 138 share the same antenna structure. In at least one embodiment, the first antenna 108, the second antenna 116 and/or the third antenna 138 have separate antenna structures. The collocation adjustment circuit 114 is coupled between the WPAN radio 132 and the LR-WPAN radio 110. The collocation adjustment circuit 114 can enable the WLAN radio 104, the third antenna 138, and LR-WPAN radio 110 to operate simultaneously or concurrently, at least for preamble detection by the LR-WPAN radio 110 in the presence of transmitted signals by WLAN radio 104 and/or WPAN radio 132. The RF coupler 136 is coupled to an output port of WPAN radio 132 and can receive a fourth RF signal 142 from WPAN radio 132. The RF coupler 136 is coupled to the third RFFE circuit 134 and can pass the fourth RF signal 142 to the third RFFE circuit 134. The third RFFE circuit 134 sends the fourth RF signal 142 via the third antenna 138. The RF coupler 136 can also generate a copy of the fourth RF signal 144. The copy of the fourth RF signal 144 can be input into the detection and selection circuit 118. The detection and selection circuit 118 can detect a presence or absence of the fourth RF signal 142. The detection and selection circuit 118 can generate control signal(s) 124 in response to detecting the presence of the first RF signal 126, the fourth RF signal 142, or both. In at least one embodiment, the detection and selection circuit 118 includes a second RF rectifier circuit coupled to the RF coupler 136 and a selection circuit to control the selection of the first path 120 or the second path 122 according to various embodiments described herein. The second RF rectifier circuit can detect the presence of the fourth RF signal 142 using the copy of the fourth RF signal 144. The RF rectifier circuit can generate a second control signal (e.g., the control signal(s) 124) in response to detecting the presence of the fourth RF signal 142. In at least one embodiment, the selection circuit includes a logic gate coupled to the RF rectifier circuit and the second RF rectifier circuit, where the logic gate outputs a third control signal in response to either the first RF signal being detected or the fourth RF signal being detected. The control signal(s) 124 can be used to control signal paths between the second RFFE circuit 112 and LR-WPAN radio 110, as described above. The LR-WPAN radio 110 can detect a preamble of a packet using the third RF signal 130 in the presence of the first RF signal 126, the fourth RF signal 142, or both. The LR-WPAN radio 110 can detect a preamble of a packet using the second RF signal 128 in the absence of the first RF signal 126, the fourth RF signal 142, or both.

In at least one embodiment, the selection circuit includes a first switch coupled to the input port, a second switch coupled to the second RFFE circuit 112, and an inverter coupled between the first switch and the second switch. The first path 120 and the second path 122 are coupled between the first switch and the second switch. The first switch and the inverter receive the third control signal. The inverter outputs a fourth control signal inverted from the third control signal. The second switch receives the fourth control signal from the inverter. The first switch and the second switch are activated to couple the second RFFE circuit to the input port via the second path in response to the third control signal and the fourth control signal, respectively. When the first switch and the second switch are not activated, the second RFFE circuit 112 is coupled to the input port via the first path 120 (i.e., in response to the absence of the first RF signal 126 and the fourth RF signal 142). In other embodiments, a different state or level of the control signal(s) 124 can be used to indicate the absence of the first RF signal 126, the fourth RF signal 142, or any combination thereof to select the first path 120.

In at least one embodiment, the selection circuit includes the SPDT switch described above.

In at least one embodiment, the wireless device 100 includes a first radio, a second radio, and a circuit coupled between the first radio and the second radio. The first radio is configured to send a first RF signal to a second wireless device. The second radio operates according to the IEEE 802.15.4 standard. The circuit is configured to detect a presence of the first RF signal. The circuit receives a second RF signal from a third wireless device. The circuit attenuates the second RF signal to obtain a third RF signal in response to the presence of the first RF signal being detected. The second radio is configured to receive the third RF signal and decode a preamble in the third RF signal. In a further embodiment, the circuit is further configured to detect an absence of the first RF signal. The circuit receives a fourth RF signal during the absence of the first RF signal. The second radio is configured to receive the fourth RF signal and decode a second preamble in the fourth RF signal.

The collocation adjustment circuit 114 can be implemented in various manners, such as illustrated and described below with respect to FIG. 2 and FIG. 3.

Figure 2:
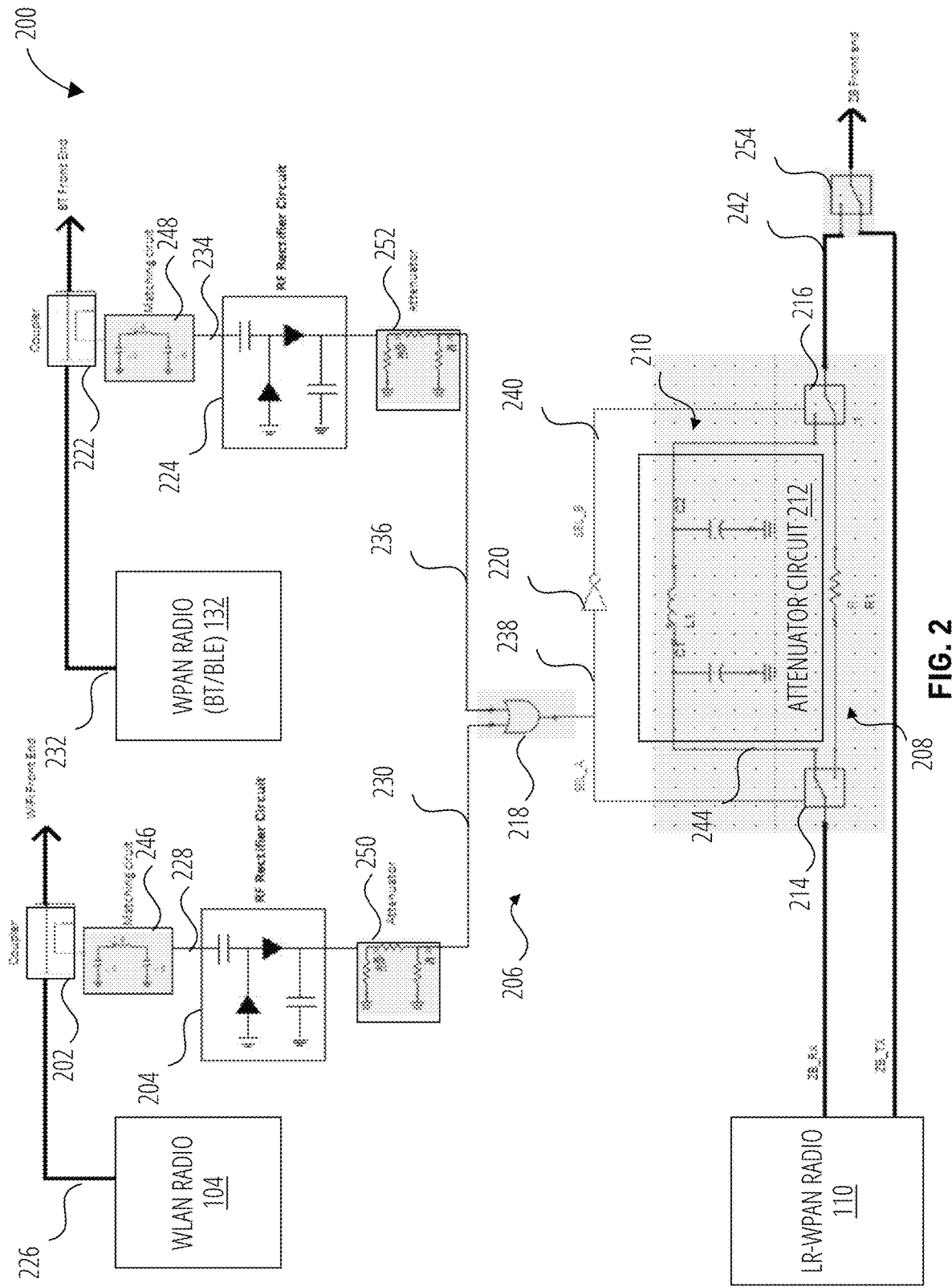
FIG. 2 is a schematic diagram of a collocation adjustment circuit coupled between a wireless local area network (WLAN) radio, a wireless personal area network (WPAN) radio, and an LR-WPAN radio, according to at least one embodiment.

FIG. 2 is a schematic diagram of a collocation adjustment circuit 200 coupled between a WLAN radio 104, a WPAN radio 132, and an LR-WPAN radio 110, according to at least one embodiment. The collocation adjustment circuit 200 includes a first RF coupler 202, a first RF rectifier circuit 204, a selection circuit 206, a first path 208, and a second path 210 including an attenuator circuit 212. The selection circuit 206 can include a first switch 214, a second switch 216, a logic gate 218, and an inverter 220. The first RF coupler 202 is coupled to the WLAN radio 104, the WLAN front-end circuit (not illustrated in FIG. 2), and the first RF rectifier circuit 204. The WLAN radio 104 can generate and send a first RF signal 226 to the WLAN front-end circuit. The first RF coupler 202 can generate a copy of the first RF signal 228 for energy detection by the first RF rectifier circuit 204. In at least one embodiment, a first matching circuit 246 is coupled between the first RF coupler 202 and the first RF rectifier circuit 204 to match an impedance between the WLAN radio 104 and the first RF rectifier circuit 204. The first RF rectifier circuit 204 can be an external RF rectifier circuit for energy detection to toggle between an optimized sensitivity path (first path 208) and an optimized blocker path (second path 210). In at least one embodiment, a second attenuator circuit 250 can be coupled between the first RF rectifier circuit 204 and the selection circuit 206. The second attenuator circuit 250 can attenuate a control signal from the first RF rectifier circuit 204 to a first control signal 230. A voltage level of the first control signal 230 corresponds to a voltage level of the selection circuit 206. The selection circuit 206 can use the first control signal 230 to switch from the first path 208 to the second path 210 when a presence of the first RF signal 226 is detected by the first RF rectifier circuit 204.

In at least one embodiment, the selection circuit 206 does not include the logic gate 218 if there is only the WLAN radio 104 and the LR-WPAN radio 110. The logic gate 218 can be used when there are one or more additional radios, such as the WPAN radio 132. In at least one embodiment, the WPAN radio 132 can generate and send a fourth RF signal 232 to the WPAN front-end circuit (not illustrated in FIG. 2). A second RF coupler 222 is coupled to the 132, the WPAN front-end circuit, and a second RF rectifier circuit 224. In at least one embodiment, a second matching circuit 248 is coupled between the second RF coupler 222 and the second RF rectifier circuit 224 to match an impedance between the WPAN radio 132 and the second RF rectifier circuit 224. The second RF rectifier circuit 224 can be an external RF rectifier circuit for energy detection to toggle between the optimized sensitivity path (first path 208) and the optimized blocker path (second path 210). In at least one embodiment, a third attenuator circuit 252 can be coupled between second RF rectifier circuit 224 and the selection circuit 206. The third attenuator circuit 252 can attenuate a control signal from the second RF rectifier circuit 224 to a second control signal 236. A voltage level of the second control signal 236 corresponds to a voltage level of the selection circuit 206. The selection circuit 206 can use the first control signal 230 and the second control signal 236 to switch from the first path 208 to the second path 210 when a presence of the first RF signal 226 is detected by the first RF rectifier circuit 204, a presence of the fourth RF signal 232 is detected by the second RF rectifier circuit 224, or both.

In at least one embodiment, the logic gate 218 is an OR gate that can receive the first control signal 230 and second control signal 236 and output a third control signal 238 to control the first switch 214. The inverter 220 can receive the third control signal 238 and output a fourth control signal 240 inverted from the third control signal 238. The fourth control signal 240 can be used to control the second switch 216. The first switch 214 can use the third control signal 238 to switch from the first path 208 to the second path 210 when a presence of the first RF signal 226 is detected by the first RF rectifier circuit 204, a presence of the fourth RF signal 232 is detected by the second RF rectifier circuit 224, or both. The second switch 216 can use the fourth control signal 240 to switch from the first path 208 to the second path 210 when a presence of the first RF signal 226 is detected by the first RF rectifier circuit 204, a presence of the fourth RF signal 232 is detected by the second RF rectifier circuit 224, or both.

In at least one embodiment, a second RF signal 242 is received from an LR-WPAN front-end circuit (not illustrated in FIG. 2). When the second path 210 is selected by the selection circuit 206, the attenuator circuits 212 attenuates the second RF signal 242 to obtain a third RF signal 244. The third RF signal 244 is input at an input port of the LR-WPAN radio 110. When the first path 208 is selected by the 206, the second RF signal 242 bypasses the attenuator circuit 212 and is input at the input port of the LR-WPAN radio 110. In at least one embodiment, the attenuator circuit 212 in the second path 210 includes an inductor coupled between the first switch 214 and the 216 and a pair of capacitors coupled in parallel, one on each end of the inductor. In at least one embodiment, the first path 208 includes a resistor coupled in series between the first switch 2214 and the second switch 216. In a further embodiment, a third switch 254 is coupled to the LR-WPAN front-end circuit, the second switch 216, and an output port of the LR-WPAN radio 110. Alternatively, the first path 208 and second path 210 can have other components to achieve the optimized sensitivity path and the optimized blocker path, respectively.

In order to support simultaneous TX and RX operations, there are two scenarios to consider. One scenario is the RX performance in the presence of the TX jammer signal, and the other scenario is the RX performance in the absence of the TX jammer signal. When using OQPSK RX sensitivity, the TX power seen by the RX chain is −20 dBm or less with comparable latency performance. For example, if the RX channel is operated at 25 MHz separation from the center frequency of the TX channel and the TX power operates at legacy rates at 18 dBm, the overall chip-to-chip isolation required is 38 dB. It may not be feasible to achieve high spatial isolation in reduced form factors, such as smart speakers and wearables. The embodiments described herein combine techniques to achieve the high isolation of 38 dB and leverage the presence of the TX jammer signal to opt for a high isolation path and the absence of the TX jammer signal to regain the RX sensitivity. In at least one embodiment, a PTA algorithm can shut down the WLAN chipset based on the PRIORITY and REQUEST line from the external LR-WPAN chipset. In order for the LR-WPAN chipset to activate the PRIORITY and REQUEST lines for RX operation, the external LR-WPAN chipset needs to effectively demodulate the RX preamble. When the collocated WLAN radio is transmitting with high TX power, this reduces the RX sensitivity of the external LR-WPAN chipset, thereby reducing the range of the external LR-WPAN chipset or increasing the number of packet retries or dropping the packets. The embodiments show two approaches to maximize the receiver signal-to-noise (SNR) of the external LR-WPAN chipset in the presence of the TX jammer signal(s) by choosing the wideband rejection path with increased noise floor without shifting the dynamic range to handle a strong jammer signal in preventing the RX LNA from saturating. In at least one embodiment, an external RF rectifier circuit for energy detection feeds into an SPDT, or a TX packet-based GPIO feeds into the SPDT. The two paths are the optimized Sensitivity path and the optimized blocker path. In the presence of the in-band collocated radio jammer signal, the SEL_A and SEL_B lines toggle can choose the optimized blocker path (Path_2), leading to better linearity performance of the LNA in the presence of the in-band jammer. If this solution is not present, the RX preamble cannot be detected due to the saturation of the LNA in the presence of the in-band jammer. In the absence of the in-band collocated radio jammer, the SEL_A and SEL_B lines toggle to choose the optimized Sensitivity path with lesser insertion loss, leading to a lower noise figure with better sensitivity.

Figure 3:
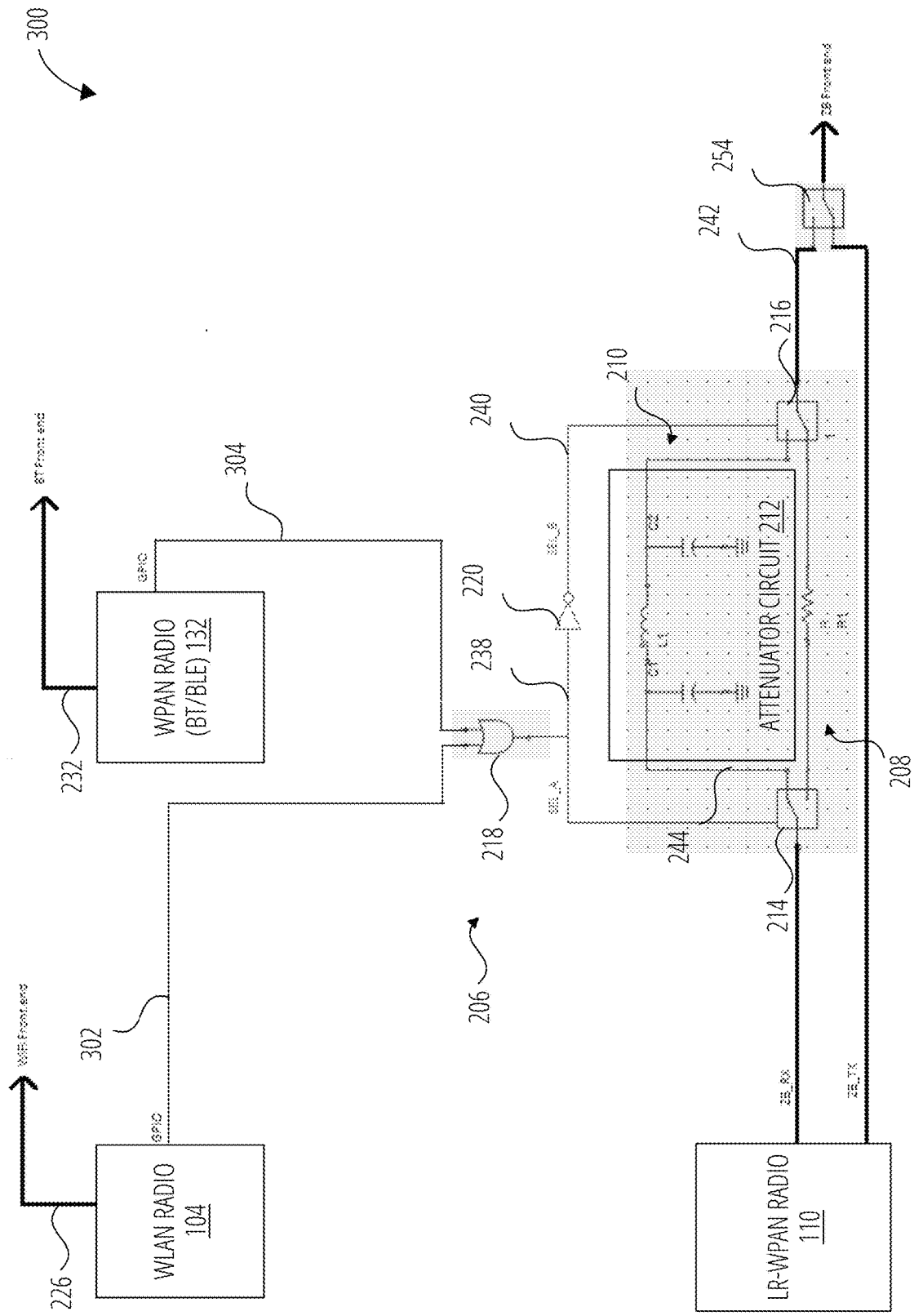
FIG. 3 is a schematic diagram of a collocation adjustment circuit coupled between a WLAN radio, a WPAN radio, and an LR-WPAN radio, according to at least one embodiment.

FIG. 3 is a schematic diagram of a collocation adjustment circuit 300 coupled between a WLAN radio 104, a WPAN radio 132, and an LR-WPAN radio 110, according to at least one embodiment. The collocation adjustment circuit 300 is similar to the collocation adjustment circuit 200 as noted by similar reference numbers, except the selection circuit 206 receives a first control signal 302 from the WLAN radio 104 and a second control signal 304 from the WPAN radio 132. The first control signal 302 can be a status signal or bit on a general-purpose input-output (GPIO) terminal of the WLAN radio 104. The status signal or bit can indicate that the WLAN radio 104 is transmitting the first RF signal 226. The second control signal 304 can be a status signal or bit on a GPIO terminal of the WPAN radio 132. The status signal or bit can indicate that the WPAN radio 132 is transmitting the fourth RF signal 232. In this embodiment, the WLAN radio 104 can provide a TX packet-based GPIO toggle for switching between the optimized sensitivity path (first path 208) and the optimized blocker path (second path 210). The WPAN radio 132 can also provide a TX packet-based GPIO toggle for switching between the optimized sensitivity path (first path 208) and the optimized blocker path (second path 210).

Figure 4:
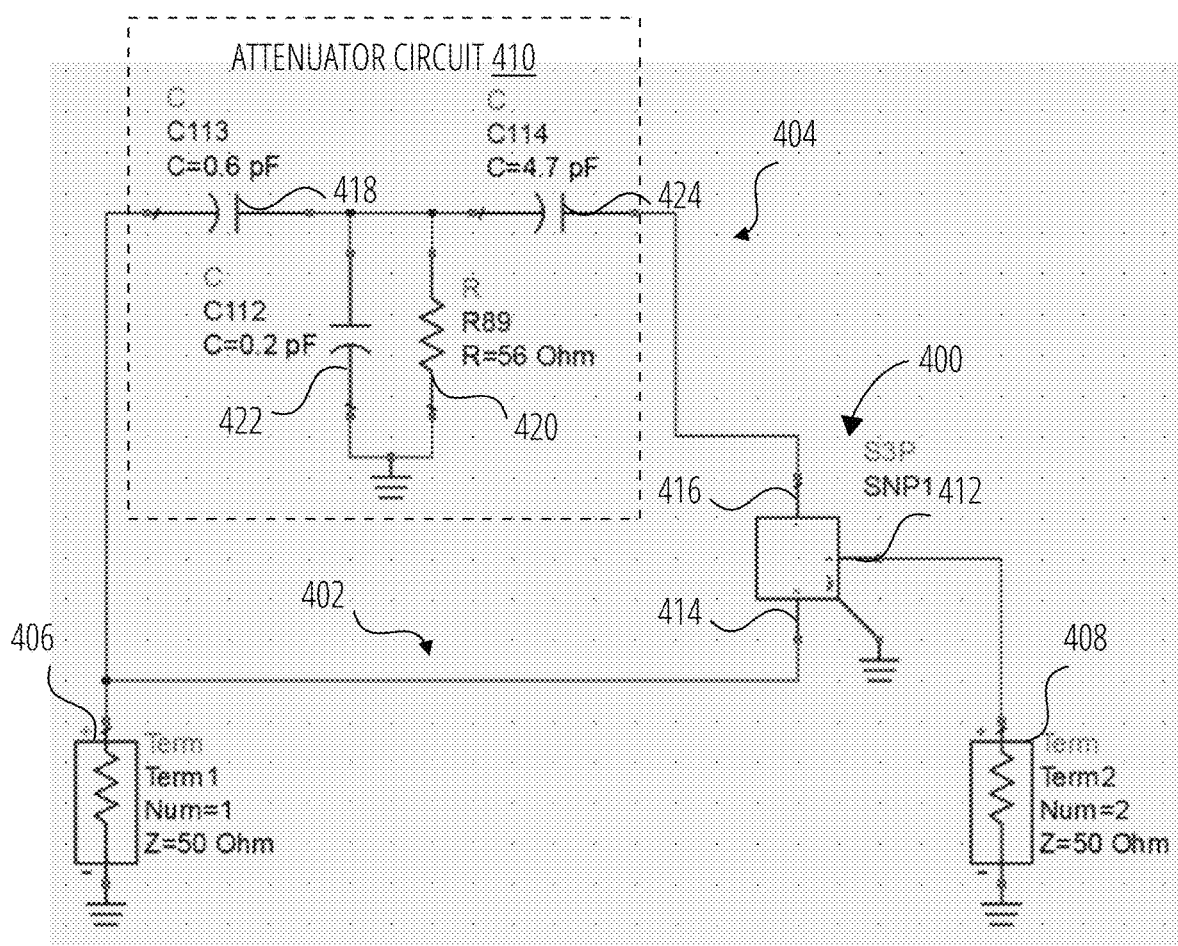
FIG. 4 is a schematic diagram of a single-pole double-throw (SPDT) switch for selecting between a first path and a second path according to at least one embodiment.

In other embodiments, the selection circuit 206 can include other architectures, such as illustrated in an architecture with a single-pole double-throw (SPDT) switch in FIG. 4.

FIG. 4 is a schematic diagram of an SPDT switch 400 for selecting between a first path 402 and a second path 404 according to at least one embodiment. The SPDT switch 400 includes a first terminal 412 coupled to a terminal of a front-end circuit 408, a second terminal 414 coupled to an input port 406 of an LR-WPAN radio, and a third terminal 416 coupled to an attenuator circuit 410 in the second path 404. The first path 402 is a bypass path between the front-end circuit 408 and the input port 406. As described above, the bypass path can provide the optimized sensitivity path when no jammer signals are detected. The second path 404 can include the attenuator circuit 410 to provide the optimized sensitivity path when one or more jammer signals are detected, as described above.

In at least one embodiment, the SPDT switch 400 can switch between a low-coupling branch and a bypass branch of the SPDT switch 400. The SPDT switch 400 can operate in a bypass mode or an attenuation mode. The low-coupling branch can include a first capacitor 418 (e.g., 0.6 picofarads (pF) and a single shunt resistor 420. The low-coupling branch can also include a second capacitor 422 coupled in parallel to the shunt resistor 420 and a third capacitor 424 coupled in series with the first capacitor 418. The low-coupling branch can act as an attenuator circuit and improve return loss from the perspective of the antenna side. The low-coupling branch will have a small impact on insertion loss and return loss to the bypass branch since the low-coupling branch is not removed from the circuit in this embodiment. Attenuation by the attenuator circuit 410 can be achieved by changing the capacitor values of the first capacitor 418, second capacitor 422, and third capacitor 424, and the resistor value of the shunt resistor 420.

The SPDT switch 400 can have a slightly reduced performance in the bypass mode and less consistent attenuation in the attenuation mode but can achieve comparable results as the architectures of FIG. 2 and FIG. 3 with the benefit of having a smaller layout space requirement and lower cost by removing components, such as one SPDT, two coupling capacitors, and one resistor.

Figure 5:
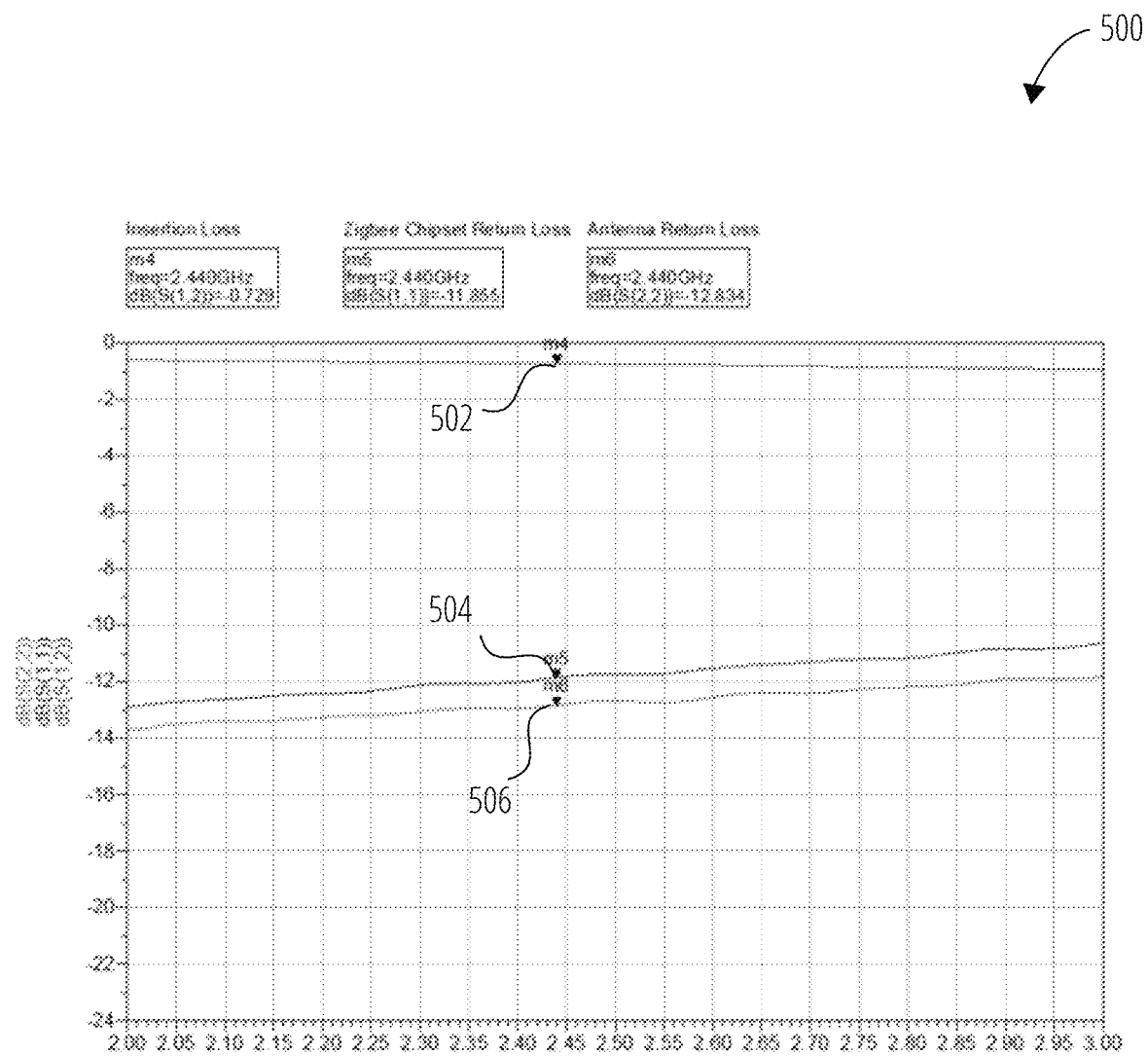
FIG. 5 is a graph illustrating performance in a bypass state of the SPDT switch of FIG. 4 according to at least one embodiment.

FIG. 5 is a graph 500 illustrating performance in a bypass state of the SPDT switch 400 of FIG. 4 according to at least one embodiment. The graph 500 illustrates an insertion loss 502, a return loss 504 of the LR-WPAN radio, and an antenna return loss 506. At 2.44 GHZ, the insertion loss 502 is −0.729, the return loss 504 is −11.855, and the antenna return loss 506 is −12.834 in the bypass state.

Figure 6:
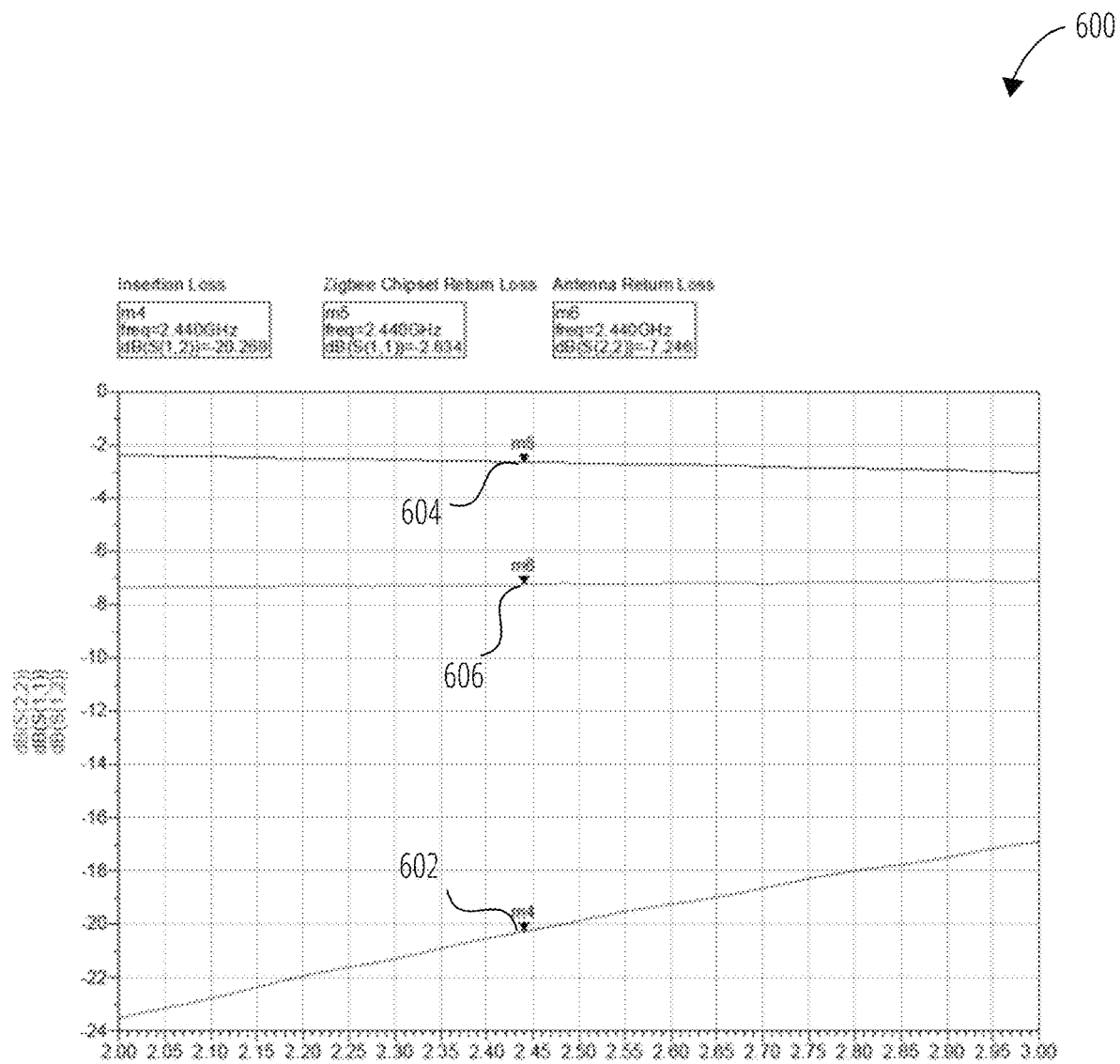
FIG. 6 is a graph illustrating performance in an attenuation state of the SPDT switch of FIG. 4 according to at least one embodiment.

FIG. 6 is a graph 600 illustrating performance in an attenuation state of the SPDT switch 400 of FIG. 4 according to at least one embodiment. The graph 600 illustrates an insertion loss 602, a return loss 604 of the LR-WPAN radio, and an antenna return loss 606. At 2.44 GHz, the insertion loss 602 is −20.269, the return loss 604 is −2.634, and the antenna return loss 606 is −7.246 in the attenuation state.

Figure 7:
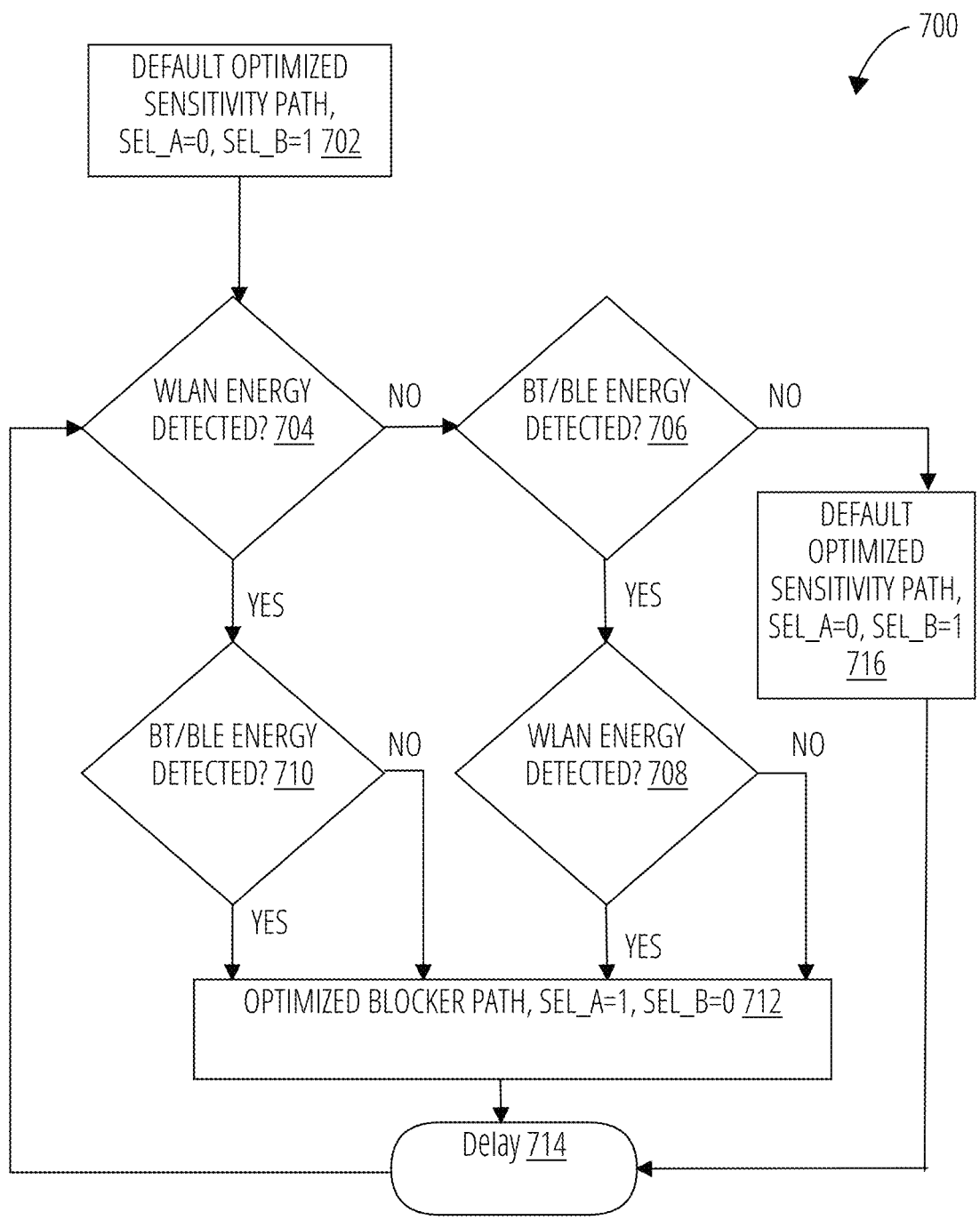
FIG. 7 is a flow diagram of a method for toggling between a first path and a second path in response to a presence or absence of a transmitted RF signal according to at least one embodiment.

FIG. 7 is a flow diagram of a method 700 for toggling between a first path and a second path in response to a presence or absence of a transmitted RF signal according to at least one embodiment. The method 700 may be performed by processing logic that comprises hardware (e.g., circuitry, dedicated logic, programmable logic, microcode, etc.), software, firmware, or a combination thereof. In one embodiment, the method 700 may be performed by the wireless device 100 of FIG. 1. In another, the method 700 may be performed by collocation adjustment circuit 114 of FIG. 1.

In another, portions of the method 700 can be performed by collocation adjustment circuit 200 of FIG. 2. In another, the method 700 may be performed by collocation adjustment circuit 300 of FIG. 3. In another, the method 700 can be performed by any of the wireless devices described herein.

Referring to FIG. 7, the method 700 begins with the processing logic selecting an optimized sensitivity path (block 702). The optimized sensitivity path can be a default path. The optimized sensitivity path can be set using a zero value for the first control signal and a one value for the second control signal (SEL_A=0 and SEL_B=1). At block 704, the processing logic determines whether WLAN energy is detected. If not WLAN energy is detected at block 704, the processing logic determines whether BT/BLE energy is detected (block 706). If no BT/BLE energy is detected at block 706, the processing logic continues to select the optimized sensitivity path (block 716) and proceeds to block 714 for a specified delay (e.g., five nsec) before returning to block 704. If the WLAN energy is detected at block 704, the processing logic determines whether the BT/BLE energy is detected at block 710. If the BT/BLE energy is detected or not at block 710, the processing logic selects the optimized blocker path (block 712). The optimized blocker path can be set using a one value for the first control signal and a zero value for the second control signal (SEL_A=1 and SEL_B=0). If the BT/BLE energy is detected at block 706, the processing logic determines whether the WLAN energy is detected at block 708. If the WLAN energy is detected or not at block 708, the processing logic selects the optimized blocker path (block 712). After setting the optimized blocker path at block 712, the processing logic proceeds to block 714 for the specified delay before returning to block 704.

Figure 8:
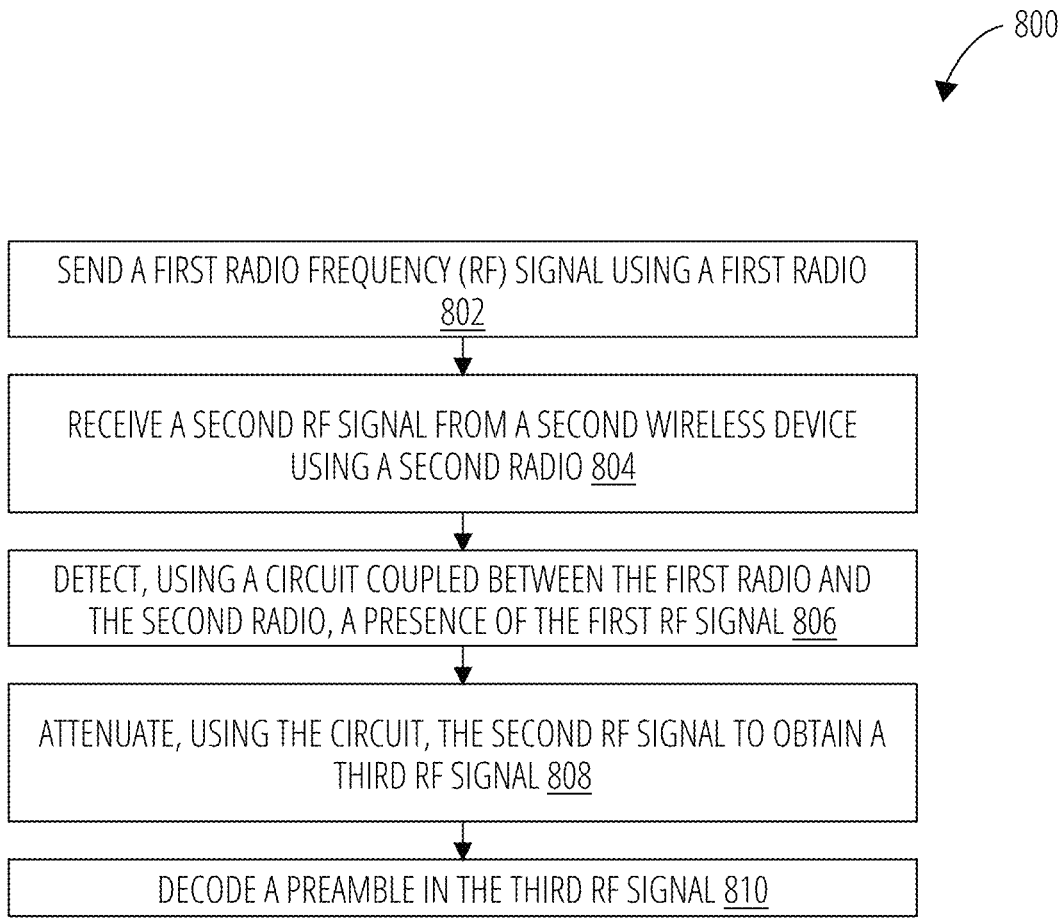
FIG. 8 is a flow diagram of a method of selectively attenuating a receive RF signal in response to a transmit RF signal being detected according to at least one embodiment.

FIG. 8 is a flow diagram of a method 800 of selectively attenuating a receive RF signal in response to a transmit RF signal being detected according to at least one embodiment. The method 800 may be performed by processing logic that comprises hardware (e.g., circuitry, dedicated logic, programmable logic, microcode, etc.), software, firmware, or a combination thereof. In one embodiment, the method 800 may be performed by the wireless device 100 of FIG. 1. In another, the method 800 may be performed by collocation adjustment circuit 114 of FIG. 1. In another, portions of the method 800 can be performed by collocation adjustment circuit 200 of FIG. 2. In another, the method 800 may be performed by collocation adjustment circuit 300 of FIG. 3. In another, the method 800 can be performed by any of the wireless devices described herein.

Referring to FIG. 8, the method 800 begins with the processing logic sending a first radio frequency (RF) signal to a second wireless device using a first radio (block 802). At block 804, the processing logic receives a second RF signal from a third wireless device using a second radio that operates according to the IEEE 802.15.4 standard. At block 806, the processing logic detects, using a circuit coupled between the first radio and the second radio, a presence of the first RF signal. At block 808, the processing logic attenuates, using the circuit, the second RF signal to obtain a third RF signal in response to the presence of the first RF signal being detected. At block 810, the processing logic decodes a preamble in the third RF signal.

In a further embodiment, the processing logic can send a fourth RF signal to a fourth wireless device using a third radio. The third radio can be a PAN radio that operates according to the IEEE 802.15.1 standard. The processing logic can detect a presence of the fourth RF signal. The processing logic can attenuate the second RF signal to obtain the third RF signal in response to the presence of the first RF signal or the fourth RF signal being detected.

In a further embodiment, the processing logic can detect the presence of the first RF signal by generating a copy of the first RF signal using an RF coupler of the circuit and detecting the presence of the first RF signal using an RF rectifier circuit of the circuit and the copy of the first RF signal. The processing logic can generate a control signal using the RF rectifier circuit in response to detecting the presence of the first RF signal. The processing logic can attenuate the second RF signal by coupling an attenuator circuit to an input port of the second radio in response to the control signal and attenuating the second RF signal using the attenuator circuit.

In a further embodiment, the processing logic can attenuate the second RF signal by controlling a pair of switches to couple an attenuator circuit in a path between an input port of the second radio and an RFFE circuit and attenuating the second RF signal using the attenuator circuit.

In a further embodiment, the processing logic can attenuate the second RF signal by controlling an SPDT switch to couple an attenuator circuit to an input port of the second radio and attenuating the second RF signal using the attenuator circuit.

Figure 9:
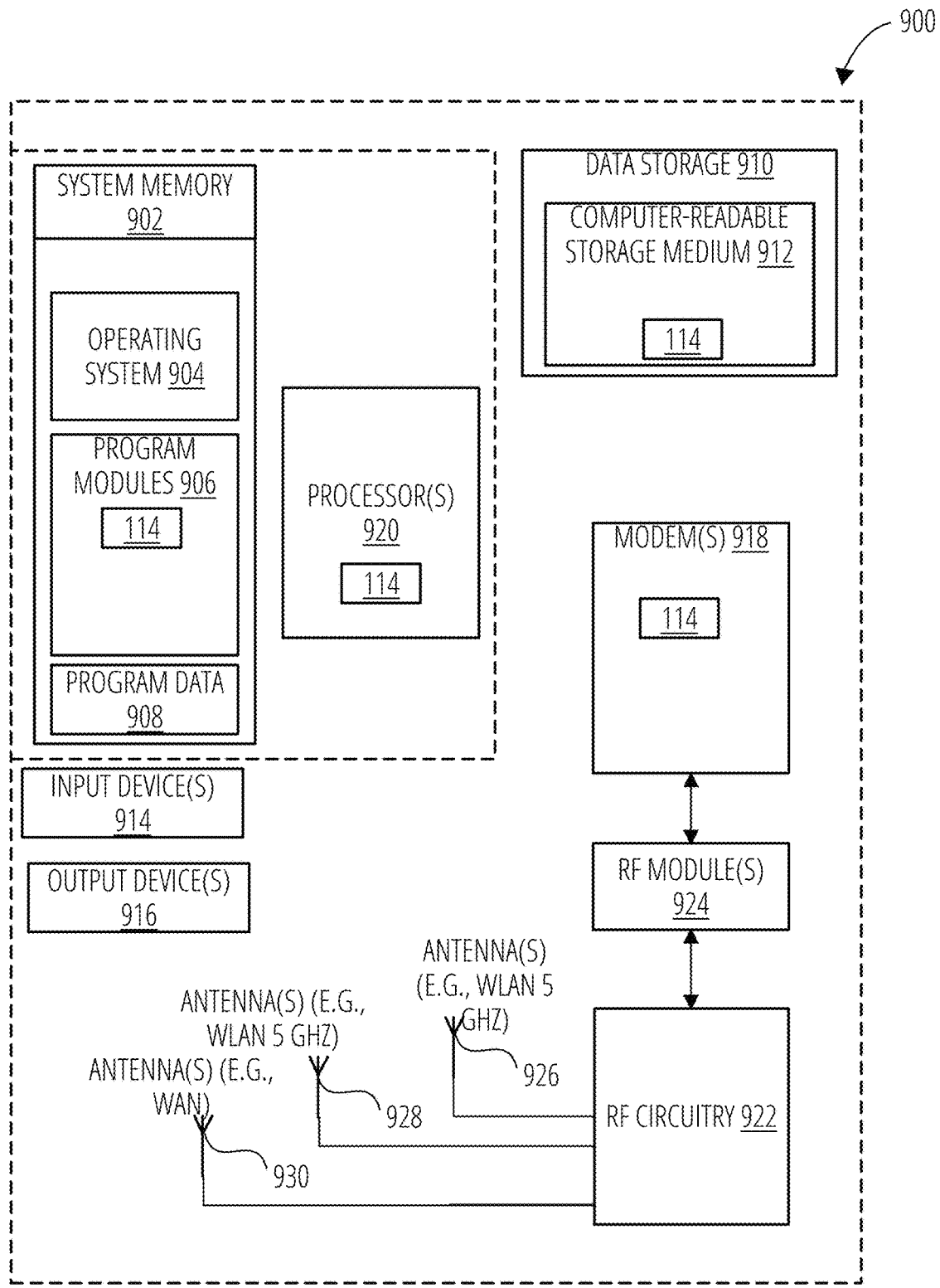
FIG. 9 is a block diagram of a wireless device with the collocation adjustment circuit according to one embodiment.

FIG. 9 is a block diagram of a wireless device 900 with the collocation adjustment circuit 114 according to one embodiment. The wireless device 900 may correspond to the wireless devices described above with respect to FIG. 1 to FIG. 4. Alternatively, the wireless device 900 may be other electronic devices, as described herein.

The wireless device 900 includes one or more processor(s) 920, such as one or more central processing units (CPUs), microcontrollers, field programmable gate arrays, or other types of processors. The wireless device 900 also includes system memory 902, which may correspond to any combination of volatile and/or non-volatile storage mechanisms. The system memory 902 stores information that provides operating system 904, various program modules 906, program data 908, and/or other components. In one embodiment, the system memory 902 stores instructions of methods to control the operation of the wireless device 900. The wireless device 900 performs functions by using the processor(s) 920 to execute instructions provided by the system memory 902. In one embodiment, the program modules 906 may include collocation adjustment circuit 114. The collocation adjustment circuit 114 may perform some of the operations of the processes described herein.

The wireless device 900 also includes a data storage device 910 that may be composed of one or more types of removable storage and/or one or more types of non-removable storage. The data storage device 910 includes a computer-readable storage medium 912 on which is stored one or more sets of instructions embodying any of the methodologies or functions described herein. Instructions for the program modules 906 (e.g., collocation adjustment circuit 114) may reside, completely or at least partially, within the computer-readable storage medium 912, system memory 902 and/or within the processor(s) 920 during execution thereof by the wireless device 900, the system memory 902 and the processor(s) 920 also constituting computer-readable media. The wireless device 900 may also include one or more input devices 918 (keyboard, mouse device, specialized selection keys, etc.) and one or more output devices 920 (displays, printers, audio output mechanisms, etc.).

The wireless device 900 further includes a modem 918 to allow the wireless device 900 to communicate via a wireless connection (e.g., such as provided by the wireless communication system) with other computing devices, such as remote computers, an item-providing system, and so forth. The modem 918 can be connected to one or more radio frequency (RF) modules 924. The RF modules 924 may be a WLAN module, a wide area network (WAN) module, a personal area network (PAN) module, Global Positioning System (GPS) module, or the like. The antenna structures (antenna(s) 926, 928, 930) are coupled to the RF circuitry 922, which is coupled to the modem 918. The RF circuitry 922 may include radio front-end circuitry, antenna switching circuitry, impedance matching circuitry, or the like. The antennas 926 may be GPS antennas, Near Field Communication (NFC) antennas, other WAN antennas, WLAN or PAN antennas, or the like. The modem 918 allows the wireless device 900 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 918 may generate signals and send these signals to the antenna(s) 926 of a first type (e.g., WLAN 5 GHZ), antenna(s) 928 of a second type (e.g., WLAN 2.4 GHZ), and/or antenna(s) 930 of a third type (e.g., WAN), via RF circuitry 922, and RF module(s) 924 as described herein. Antennas 926, 928, 930, may be configured to transmit in different frequency bands and/or using different wireless communication protocols. The antennas 926, 928, 930, may be directional, omnidirectional, or non-directional antennas. In addition to sending data, antennas 926, 928, 930, may also receive data, which is sent to appropriate RF modules connected to the antennas. One of the antennas 926, 928, 930 may be any combination of the antenna structures described herein.

In one embodiment, the wireless device 900 establishes a first connection using a first wireless communication protocol and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network, and the second wireless connection may be associated with serving a content file to a client consumption device, as described herein.

Though a modem 918 is shown to control transmission and reception via antenna (926, 928, 930), the wireless device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
    a first radio that operates according to the IEEE 802.11 standard and outputs a first radio frequency (RF) signal on an output port;
    an RF coupler coupled between the output port of the first radio and a first RF front-end (RFFE) circuit;
    an RF rectifier circuit coupled to the RF coupler, wherein the RF rectifier circuit detects the first RF signal and generates a control signal in response to detecting the first RF signal;
    a second radio that operates according to the IEEE 802.15.4 standard;
    a first path between an input port of the second radio and a second RFFE circuit;
    a second path between the input port and the second RFFE circuit, wherein the second path comprises an attenuator circuit that receives a second RF signal from the second RFFE circuit and attenuates the second RF signal to obtain a third RF signal; and
    a selection circuit coupled to the RF rectifier circuit, the first path, and the second path, wherein the selection circuit couples the second RFFE circuit to the input port via the second path in response to receiving the control signal from the RF rectifier circuit, and wherein the second radio detects a preamble of a packet using the third RF signal.

2. The wireless device of claim 1, wherein the selection circuit comprises:
    a first switch coupled to the input port, the first path, and the second path, wherein the first switch receives the control signal from the RF rectifier circuit;
    a second switch coupled to the second RFFE circuit, the first path, and the second path; and
    an inverter coupled between the first switch and the second switch, wherein the inverter receives the control signal and outputs a second control signal inverted from the control signal, wherein the second switch receives the second control signal from the inverter, and wherein the first switch and the second switch in combination couple the second RFFE circuit to the input port via the second path in response to the control signal and the second control signal, respectively.

3. The wireless device of claim 1, further comprising:
    a third radio that outputs a fourth RF signal on an output port of the second radio;
    a second RF coupler coupled to the output port of the second radio and a third RFFE circuit; and
    a second RF rectifier circuit coupled to the second RF coupler, wherein the second RF rectifier circuit detects the fourth RF signal and generates a second control signal in response to detecting the fourth RF signal, wherein the selection circuit comprises:
    a logic gate coupled to the RF rectifier circuit and the second RF rectifier circuit, wherein the logic gate outputs a third control signal in response to either the first RF signal being detected or the fourth RF signal being detected;
    a first switch coupled to the input port, the first path, and the second path, wherein the first switch receives the third control signal from the logic gate;
    a second switch coupled to the second RFFE circuit, the first path, and the second path; and
    an inverter coupled between the first switch and the second switch, wherein the inverter receives the third control signal and outputs a fourth control signal inverted from the third control signal, and wherein the second switch receives the fourth control signal from the inverter, and wherein the first switch and the second switch in combination couple the second RFFE circuit to the input port via the second path in response to the third control signal and the fourth control signal, respectively.

4. The wireless device of claim 1, wherein the selection circuit comprises:
    a single-pole double-throw (SPDT) switch coupled to the second RFFE circuit at a first terminal of the SPDT switch, the first path at a second terminal of the SPDT switch, and the second path at a third terminal of the SPDT switch, wherein the first path and the second path are coupled to the input port, wherein the SPDT switch couples the second RFFE circuit to the input port via the second path in response to the control signal.

5. A wireless device comprising:
    a first radio configured to output a first radio frequency (RF) signal;
    a second radio, wherein the first radio and the second radio are collocated; and
    a circuit coupled between the first radio and the second radio, wherein the circuit is configured to:
    detect a presence of the first RF signal;
    receive a second RF signal from a second wireless device; and
    attenuate the second RF signal to obtain a third RF signal, wherein the second radio is configured to receive the third RF signal and decode a preamble in the third RF signal.

6. The wireless device of claim 5, wherein the circuit comprises:
    a first path between an input port of the second radio and an RFFE circuit, wherein the input port is configured to receive the second RF signal via the first path in response to the first RF signal not being detected;
    a second path between the input port and the RFFE circuit, wherein the second path comprises an attenuator circuit configured to receive the second RF signal from the RFFE circuit and attenuate the second RF signal to obtain the third RF signal, wherein the input port is configured to receive the third RF signal via the second path in response to the first RF signal being detected;
    a first switch coupled to the input port, the first path, and the second path;
    a second switch coupled to the RFFE circuit, the first path, and the second path; and
    an inverter coupled between the first switch and the second switch, wherein the inverter receives a control signal indicative of the presence of the first RF signal and outputs a second control signal inverted from the control signal, and wherein the first switch and the second switch in combination are configured to:
couple the second RFFE circuit to the input port via the second path in response to the control signal and the second control signal, respectively; or
couple the second RFFE circuit to the input port via the first path in response to the first RF signal not being detected.

7. The wireless device of claim 5, wherein the circuit comprises:
a first path between an input port of the second radio and an RFFE circuit, wherein the input port is configured to receive the second RF signal via the first path in response to the first RF signal not being detected;
a second path selectively coupled between the input port and the RFFE circuit, wherein the second path comprises an attenuator circuit configured to receive the second RF signal from the RFFE circuit and attenuate the second RF signal to obtain the third RF signal; and
a single-pole double-throw (SPDT) switch coupled to the RFFE circuit at a first terminal, the first path at a second terminal, and the second path at a third terminal, wherein the first path and the second path are coupled to the input port, wherein the SPDT switch is configured to:
couple the second RFFE circuit to the input port via the second path in response to a control signal indicating presence of the first RF signal; or
couple the second RFFE circuit to the input port via the first path in response to the first RF signal not being detected.

8. The wireless device of claim 5, wherein the circuit is further configured to:
detect an absence of the first RF signal; and
receive a fourth RF signal during the absence of the first RF signal, wherein the second radio is configured to receive the fourth RF signal and decode a second preamble using the fourth RF signal.

9. The wireless device of claim 5, wherein the circuit comprises:
a first path selectively coupled between an input port of the second radio and an RFFE circuit, wherein the input port is configured to receive a fourth RF signal via the first path in response to the first RF signal not being detected;
a second path selectively coupled between the input port and the RFFE circuit, wherein the second path comprises an attenuator circuit configured to receive the second RF signal from the RFFE circuit and attenuate the second RF signal to obtain the third RF signal; and
a selection circuit coupled to the first path and the second path, wherein the selection circuit is configured to couple the RFFE circuit to the input port via the second path in response to the presence of the first RF signal being detected and couple the RFFE circuit to the input port via the first path in response to the first RF signal not being detected.

10. The wireless device of claim 5, wherein the circuit comprises:
an RF coupler coupled between an output port of the first radio and a first RF front-end (RFFE) circuit;
an RF rectifier circuit coupled to the RF coupler, wherein the RF rectifier circuit is configured to detect the first RF signal and generate a first control signal in response to detecting the first RF signal; and
a selection circuit coupled to the RF rectifier circuit, wherein the selection circuit is configured to couple an attenuator circuit between an input port of the second radio and a second RFFE circuit in response to a control signal, wherein the attenuator circuit is configured to attenuate the second RF signal to obtain the third RF signal.

11. The wireless device of claim 10, further comprising:
a matching circuit coupled between the RF coupler and the RF rectifier circuit; and
a second attenuator circuit coupled between the RF rectifier circuit and the selection circuit, wherein:
the selection circuit comprises at least one switch;
the second attenuator circuit is to attenuate a second control signal received from the RF rectifier circuit to obtain the first control signal; and
a voltage level of the first control signal corresponds to a voltage level of the at least one switch.

12. The wireless device of claim 10, further comprising:
a third radio that outputs a fourth RF signal; and
a second RF coupler coupled to the third radio and a second RFFE circuit; and
a second RF rectifier circuit coupled to the second RF coupler, wherein the second RF rectifier circuit is configured to detect the fourth RF signal and generate a second control signal in response to detecting the fourth RF signal, wherein the selection circuit comprises:
a logic gate coupled to the RF rectifier circuit and the second RF rectifier circuit, wherein the logic gate is configured to output a third control signal in response to either the first RF signal being detected or the fourth RF signal being detected, wherein the selection circuit is configured to couple the attenuator circuit between the input port of the second radio and the second RFFE circuit in response to the third control signal.

13. The wireless device of claim 12, wherein the first radio operates according to the IEEE 802.11 standard, wherein the second radio operates according to the IEEE 802.15.4 standard, and wherein the third radio operates according to the IEEE 802.15.1 standard.

14. The wireless device of claim 5, wherein the first radio operates according to the IEEE 802.11 standard, and wherein the second radio operates according to the IEEE 802.15.4 standard.

15. The wireless device of claim 5, further comprising:
a first matching circuit coupled between the RF coupler and the RF rectifier circuit;
a second attenuator circuit coupled between the RF rectifier circuit and the logic gate; and
wherein:
the selection circuit comprises at least one switch;
the second attenuator circuit is to attenuate a second control signal received from the RF rectifier circuit to obtain the first control signal; and
a voltage level of the first control signal corresponds to a voltage level of the at least one switch.

16. A method of operating a wireless device, the method comprising:
sending a first radio frequency (RF) signal using a first radio;
receiving a second RF signal from a second wireless device using a second radio, wherein the first radio and the second radio are collocated;
detecting, using a circuit coupled between the first radio and the second radio, a presence of the first RF signal;
attenuating, using the circuit, the second RF signal to obtain a third RF signal; and decoding a preamble in the third RF signal.

17. The method of claim 16, further comprising:
sending a fourth RF signal to a fourth wireless device using a third radio;
detecting, using the circuit, a presence of the fourth RF signal; and
attenuating, using the circuit, the fourth RF signal to obtain the third RF signal.

18. The method of claim 16, wherein detecting the presence of the first RF signal comprises:
generating a copy of the first RF signal using an RF coupler of the circuit;
detecting the presence of the first RF signal using an RF rectifier circuit of the circuit and the copy of the first RF signal; and
generating a control signal using the RF rectifier circuit in response to detecting the presence of the first RF signal, wherein attenuating the second RF signal comprises:
coupling an attenuator circuit to an input port of the second radio in response to the control signal; and
attenuating the second RF signal using the attenuator circuit.

19. The method of claim 16, wherein attenuating the second RF signal comprises:
controlling a pair of switches to couple an attenuator circuit in a path between an input port of the second radio and an RF front-end (RFFE) circuit; and
attenuating the second RF signal using the attenuator circuit.

20. The method of claim 16, wherein attenuating the second RF signal comprises:
controlling a single-pole double-throw (SPDT) switch to couple an attenuator circuit to an input port of the second radio; and
attenuating the second RF signal using the attenuator circuit.

* * * * *